United States Patent
Tapia

(10) Patent No.: US 10,506,460 B2
(45) Date of Patent: Dec. 10, 2019

(54) SELF-ORGANIZING NETWORK MECHANISM FOR ENERGY SAVING DURING AN OUTAGE

(71) Applicant: T-Mobile USA, Inc., Bellevue, WA (US)

(72) Inventor: Pablo Tapia, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/496,185

(22) Filed: Sep. 25, 2014

(65) Prior Publication Data

US 2015/0050925 A1 Feb. 19, 2015

Related U.S. Application Data

(63) Continuation-in-part of application No. 13/831,082, filed on Mar. 14, 2013, now Pat. No. 10,243,794.

(Continued)

(51) Int. Cl.
*H04W 24/04* (2009.01)
*H04L 12/24* (2006.01)
(Continued)

(52) U.S. Cl.
CPC .......... *H04W 24/04* (2013.01); *H04L 41/082* (2013.01); *H04L 41/0816* (2013.01);
(Continued)

(58) Field of Classification Search
CPC . H04L 12/413; H04L 12/4625; H04L 41/069; H04L 41/0823; H04L 45/028;
(Continued)

(56) References Cited

U.S. PATENT DOCUMENTS

2002/0158897 A1 10/2002 Besaw et al.
2005/0007993 A1 1/2005 Chambers et al.
(Continued)

FOREIGN PATENT DOCUMENTS

CN 103227995 7/2013
EP 2403290 A1 1/2012
(Continued)

OTHER PUBLICATIONS

Movehedi, et al., "A Survey of Autonomic Network Architentures and Evaluation Criteria", IEEE Communications Surveys & Tutorials, vol. 14, No. 2, Second Quarter 2012, pp. 464-490.
(Continued)

*Primary Examiner* — Nicholas R Taylor
*Assistant Examiner* — Michael Li
(74) *Attorney, Agent, or Firm* — Lee & Hayes, P.C.

(57) ABSTRACT

Described herein is a self-organizing network (SON) configured to receive information indicating that access network equipment is experiencing a power outage. In response, the SON determines at least one of a time since the power outage, a present configuration of the access network equipment, a characteristic of the access network equipment, or a value of a performance indicator associated with the access network equipment. The SON then generates an updated configuration of the access network equipment based at least in part on the at least one of the time since the power outage, the present configuration of the access network equipment, the characteristic of the access network equipment, or the value of the performance indicator. Further, the SON then provides the updated configuration to the access network equipment.

20 Claims, 6 Drawing Sheets

Related U.S. Application Data

(60) Provisional application No. 61/695,212, filed on Aug. 30, 2012.

(51) Int. Cl.
*H04W 52/02* (2009.01)
*H04W 84/18* (2009.01)

(52) U.S. Cl.
CPC .......... *H04L 41/0886* (2013.01); *H04L 41/20* (2013.01); *H04W 52/0203* (2013.01); *H04W 84/18* (2013.01); *Y02D 70/00* (2018.01); *Y02D 70/122* (2018.01); *Y02D 70/124* (2018.01); *Y02D 70/1262* (2018.01); *Y02D 70/142* (2018.01); *Y02D 70/144* (2018.01); *Y02D 70/166* (2018.01)

(58) Field of Classification Search
CPC ..... H04L 12/10; H04L 12/2834; H04L 41/00; H04L 41/022; H04L 41/0233; H04L 41/0686; H04L 41/0816; H04L 43/12; H04L 43/0847; H04L 41/20; H04L 41/082; H04L 41/0631; H04L 41/0886; H04L 43/10; H04L 43/0817; H04L 41/147; H04L 41/0681; H04W 24/02; H04W 24/04; H04W 24/08; H04W 36/0083; H04W 24/00; H04W 24/022; H04W 72/085; H04W 52/0203; H04W 84/18; H04W 52/0264; H04W 84/045; H04W 52/0206; H04W 52/0277; H04W 16/00; G08B 27/005; H02J 9/06; H02J 1/10; H02J 7/34; H02J 9/061; H04Q 9/00; H04Q 2213/13103; H04Q 2213/13106; H04Q 2213/13166; Y02B 60/50; G01R 31/3662; G01R 31/3679; G06F 11/2015; H04M 3/5158; Y02D 70/25; Y02D 70/146

See application file for complete search history.

(56) References Cited

U.S. PATENT DOCUMENTS

| | | | |
|---|---|---|---|
| 2005/0165906 A1 | 7/2005 | Deo et al. | |
| 2008/0139197 A1* | 6/2008 | Misra | H04L 43/12 455/423 |
| 2008/0155087 A1 | 6/2008 | Blouin et al. | |
| 2009/0006010 A1* | 1/2009 | Van Sloun | G01R 31/3662 702/57 |
| 2009/0216881 A1* | 8/2009 | Lovy | H04L 41/0233 709/224 |
| 2009/0257353 A1 | 10/2009 | Song et al. | |
| 2010/0009694 A1* | 1/2010 | Fischer | H04M 3/5158 455/452.1 |
| 2010/0016034 A1* | 1/2010 | Lindqvist | H02J 7/34 455/573 |
| 2010/0020699 A1* | 1/2010 | On | H04W 24/02 370/241.1 |
| 2010/0100758 A1* | 4/2010 | Houmaidi | H02J 9/06 713/340 |
| 2010/0150150 A1 | 6/2010 | Paz et al. | |
| 2010/0299419 A1* | 11/2010 | Ramankutty | H04W 24/02 709/221 |
| 2010/0325267 A1* | 12/2010 | Mishra | H04L 41/069 709/224 |
| 2011/0009105 A1 | 1/2011 | Lee et al. | |
| 2011/0010751 A1 | 1/2011 | Soulhi | |
| 2011/0053587 A1 | 3/2011 | Turk et al. | |
| 2011/0083138 A1 | 4/2011 | Sivasubramanian et al. | |
| 2011/0171952 A1 | 7/2011 | Niu | |
| 2011/0261721 A1 | 10/2011 | Zhou et al. | |
| 2011/0265011 A1 | 10/2011 | Taylor et al. | |
| 2011/0286337 A1* | 11/2011 | Olsson | H04L 12/413 370/241.1 |
| 2011/0289142 A1 | 11/2011 | Whalin et al. | |
| 2011/0300871 A1 | 12/2011 | Dottling et al. | |
| 2012/0039175 A1 | 2/2012 | Sridhar et al. | |
| 2012/0059923 A1* | 3/2012 | Cleary | H04W 24/00 709/223 |
| 2012/0079066 A1 | 3/2012 | Li et al. | |
| 2012/0101952 A1 | 4/2012 | Raleigh et al. | |
| 2012/0108232 A1* | 5/2012 | Viering | H04W 24/02 455/424 |
| 2012/0144038 A1 | 6/2012 | Hildebrand | |
| 2012/0146799 A1* | 6/2012 | Bell | H04Q 9/00 340/635 |
| 2012/0166008 A1 | 6/2012 | Jeong | |
| 2012/0170478 A1* | 7/2012 | Doettling | H04W 52/0264 370/252 |
| 2012/0179822 A1 | 7/2012 | Grigsby et al. | |
| 2012/0213057 A1 | 8/2012 | Zhang et al. | |
| 2012/0307697 A1 | 12/2012 | Mukhopadhyay | |
| 2012/0320766 A1 | 12/2012 | Sridhar | |
| 2013/0104173 A1 | 4/2013 | Tjio et al. | |
| 2013/0189941 A1 | 7/2013 | Abbott et al. | |
| 2013/0242720 A1 | 9/2013 | Chou | |
| 2013/0257623 A1* | 10/2013 | Bagasra | G08B 27/005 340/657 |
| 2013/0288681 A1 | 10/2013 | Hamalainen et al. | |
| 2013/0294286 A1 | 11/2013 | Schmelz et al. | |
| 2013/0305322 A1 | 11/2013 | Raleigh et al. | |
| 2014/0031006 A1 | 1/2014 | Moore et al. | |
| 2014/0040450 A1 | 2/2014 | Sanneck et al. | |
| 2014/0068034 A1 | 3/2014 | Tapia | |
| 2014/0086073 A1 | 3/2014 | Baykal et al. | |
| 2014/0229210 A1 | 8/2014 | Sharifian et al. | |
| 2014/0250201 A1 | 9/2014 | Tapia | |
| 2014/0331277 A1 | 11/2014 | Frascadore et al. | |
| 2014/0355439 A1 | 12/2014 | Kakadia | |
| 2014/0355484 A1 | 12/2014 | Foster et al. | |
| 2015/0023209 A1 | 1/2015 | Gunnarsson et al. | |
| 2015/0026327 A1 | 1/2015 | Tang et al. | |
| 2015/0043386 A1 | 2/2015 | Racz et al. | |
| 2015/0146675 A1 | 5/2015 | Zhang et al. | |

FOREIGN PATENT DOCUMENTS

| | | |
|---|---|---|
| KR | 1020100047170 | 11/2011 |
| WO | WO2010132884 A1 | 1/2010 |
| WO | WO2013124435 | 8/2013 |
| WO | WO2013136813 | 9/2013 |
| WO | WO2014003770 | 1/2014 |
| WO | WO2014023347 | 2/2014 |

OTHER PUBLICATIONS

Nascimento, et al., "Virtual routers as a service: the RouteFlow approach leveraging software-defined networks", Proceedings of the 6th International Conference on Future Internet Technologies, May 19, 2011, pp. 34-37.

Office Action for U.S. Appl. No. 13/831,082, dated Apr. 6, 2015, Pablo Tapia, "Open Architecture for Self-Organizing Networks", 16 pages.

Panisson, et al., "Designing the Architecture of P2P-Based Network Management Systems", Proceedings of the 11th IEEE Symposium on Computers and Communications, Jun. 2006, 7 pgs.

The PCT Search Report and Written Opinion dated Dec. 2, 2013 for PCT application No. PCT/US13/57170, 10 pages.

Tirado, et al., "Affinity P2P: A self-organizing content-based locality-aware collaborative peer-to-peer network", Computer Networks 54, Jun. 1, 2010, pp. 2056-2070.

Final Office action for U.S. Appl. No. 13/831,082, dated Oct. 8, 2015, Tapia, "Open Architecture for Self-Organizing Networks", 17 pages.

Office action for U.S. Appl. No. 14/278,271, dated Dec. 10, 2015, Tapia et al., "Special Events Module for Self-Organizing Networks", 10 pages.

(56) References Cited

OTHER PUBLICATIONS

Office action for U.S. Appl. No. 14/277,389, dated Dec. 11, 2015, Tapia, "Network Support Node Traffic Reduction for Self-Organizing Networks", 16 pages.
Office action for U.S. Appl. No. 14/278,271, dated Aug. 26, 2015, Tapia et al., "Special Events Module for Self-Organizing Networks", 10 pages.
Office action for U.S. Appl. No. 14/277,389, dated Aug. 7, 2015, Li, "Network Support Node Traffic Reduction for Self-Organizing Networks", 15 pages.
The PCT Search Report and Written Opinion dated Aug. 10, 2015 for PCT application No. PCT/US2015/029518, 11 pages.
Yilmaz et al., "Analysis of Antenna Parameter Optimization Space for 3GPP LTE", Vehicular Technology Conference (VTC 2009-Fall), Sep. 2009, 6 pages.
The PCT Search Report and Written Opinion dated Jun. 29, 2016 for PCT application No. PCT/US2016/015184, 12 pages.
Office action for U.S. Appl. No. 13/831,082, dated Jul. 27, 2016, Tapia, "Open Architecture for Self-Organizing Networks", 24 pages.
Office action for U.S. Appl. No. 14/277,389, dated Jul. 28, 2016, Tapia, "Network Support Node Traffic Reduction for Self-Organizing Networks", 17 pages.
Office Action for U.S. Appl. No. 14/612,962, dated Sep. 16, 2016, Zhang et al., "Performance-Based Optimization of QoS Factors", 17 pages.
The Extended European Search Report dated Apr. 6, 2016 for European patent application No. 13833979.1, 9 pages.
The PCT Search Report and Written Opinion dated Mar. 18, 2016 for PCT Application No. PCT/US2015/050740, 12 pages.
Scully, et al., "Measurements, Architecture and Interfaces for Self-Organizing Networks", Internet Citation, Oct. 31, 2010, pp. 1-47, retrieved from the internet at URL:http://www.fp7-socrates.eu/files/Deliverables/SOCRATES_D5.10%20Measurements,%20architecture%20and%20interfaces%20for%20self-organising%20networks.pdf, retrieved on Mar. 1, 2011.
Office action for U.S. Appl. No. 14/277,389, dated Jan. 26, 2017, Tapia, "Network Support Node Traffic Reduction for Self-Organizing Networks", 17 pages.
Office action for U.S. Appl. No. 14/278,271, dated Apr. 20. 217, Tapia et al., "Special Events Module for Self-Organizing Networks", 13 pages.
Office Action for U.S. Appl. No. 14/612,962, dated Apr. 20, 2017, Zhang et al., "Performance-Based Optimization of QoS Factors", 16 pages.
The Chinese Office Action dated Sep. 5, 2016 for Chinese Patent Application No. 201380043793.9, a counterpart foreign application of U.S. Appl. No. 13/831,082, 34 pgs.
Office action for U.S. Appl. No. 14/278,271, dated Oct. 4, 2016, Tapia et al., "Special Events Module for Self-Organizing Networks", 12 pages.
Office action for U.S. Appl. No. 13/831,082, dated Jan. 13, 2017, Tapia, "Open Architecture for Self-Organizing Networks", 22 pages.
Translated Chinese Office Action dated May 12, 2017 for Chinese patent application No. 201380043793.9, a counterpart foreign application of U.S. Appl. No. 13/831,082, 31 pages.
Office action for U.S. Appl. No. 14/277,389, dated Dec. 28, 2017, Tapia, "Network Support Node Traffic Reduction for Self-Organizing Networks", 23 pages.
The Chinese Office Action dated Dec. 7, 2017 for Chinese patent application No. 201380043793.9, a counterpart foreign application of U.S. Appl. No. 13/831,082.
Office Action for U.S. Appl. No. 14/612,962, dated Sep. 1, 2017, Ting Zhang, "Performance-Based Optimization of QoS Factors", 19 pages.
Office Action for U.S. Appl. No. 14/278,271, dated Oct. 27, 2017, Tapia, "Special Events Module for Self-Organizing Networks", 19 pages.
The Extended European Search Report dated Jan. 18, 2018 for European patent application No. 15844457.0, 12 pages.
Office Action for U.S. Appl. No. 14/278,271, dated May 18, 2018, Tapia, "Special Events Module for Self-Organizing Networks", 15 pages.
The European Office Action dated May 24, 2018 for European Patent Application No. 13833979.1, a counterpart foreign application of U.S. Appl. No. 13/831,082, 9 pages.
Office Action for U.S. Appl. No. 14/612,962, dated Mar. 20, 2018, Ting Zhang, "Performance-Based Optimization of QoS Factors", 25 pages.
The European Office Action dated Aug. 6, 2018 for European Patent Application No. 15844457.0, a counterpart foreign application of U.S. Appl. No. 14/496,185, 4 pages.
The Extended European Search Report dated Jun. 15, 2018 for European patent application No. 16747001.2, 9 pages.
Ilyoung Chong Hufs Korea (Republic of), "The output draft Supplement document of Y.son-ngn;TD891 (NGN-GSI)", ITU-T draft; study period 2009-2012, International Telecommunication Union, Geneva, CH, Vo. 24/13, Feb. 16, 2012, pp. 1-32.
Office Action for U.S. Appl. No. 14/612,962, dated Oct. 5, 2018, Zhang et al, "Performance-Based Optimization of QoS Factors", 18 pages.
Non Final Office Action for U.S. Appl. No. 14/278,271 dated Nov. 19, 2018, "Special Events Module for Self-Organizing Networks ",Tapia, 22 pages.
The European Office Action dated Apr. 10, 2019 for European Patent Application No. 15844457.0, a counterpart of U.S. Appl. No. 14/496,185, 5 pages.
Office Action for U.S. Appl. No. 14/612,962, dated May 3, 2019, Zhang, "Performance-Based Optimization of QoS Factors", 18 pages.
Office Action for U.S. Appl. No. 14/278,271, dated Jun. 3, 2019, Tapia, "Special Events Module for Self-Organizing Networks", 21 pages.
The Chinese Office Action dated Sep. 5, 2019 for Chinese Patent Application No. 201580051438.5, a counterpart of U.S. Appl. No. 14/496,185, 8 pages.

* cited by examiner

SELF-ORGANIZING NETWORK MECHANISM FOR ENERGY SAVING DURING AN OUTAGE

RELATED APPLICATIONS

This patent application is a continuation-in-part of U.S. Non-provisional patent application Ser. No. 13/831,082, filed on Mar. 14, 2013, which claims priority filing benefit from U.S. Provisional Patent Application No. 61/695,212, filed Aug. 30, 2012. Application Ser. Nos. 13/831,082 and 61/695,212 are hereby incorporated by reference, in their entirety.

BACKGROUND

Self-Organizing Networks (SON) are networks capable of any or all of automatic self-configuration, self-optimization, or self-healing. Recent developments of SON have centered on radio access networks, but any sort of network may be developed into an SON, such as a smart energy grid system or a medical health system. For radio access networks, such as telecommunication networks, self-configuration may include use of "plug-and-play" techniques for automatically configuring and integrating new base stations into the networks. Self-optimization includes automatic adjustments of base station parameters based on performance indicators. Self-healing may also involve automatic adjustments of base station parameters. For instance, a neighboring base station may be automatically re-configured to support users of a failed base station.

Tools have been developed for radio access networks implementing SON technologies. Such tools may include performance management tools, radio frequency (RF) planning tools, automatic frequency planning tools, rehoming tools, or automatic cell planning tools. Each of these tools is entirely self-contained and handles everything from interfacing directly with network components to retrieve measurements and configure parameters, to smart analysis of and decisions regarding measurements and configurations, to presentation of users of relevant information. Because each tool is self-contained while performing many of the same tasks, there is a great amount of redundancy across the tools, and a heightened burden on tool developers, thereby hindering adoption of SON.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
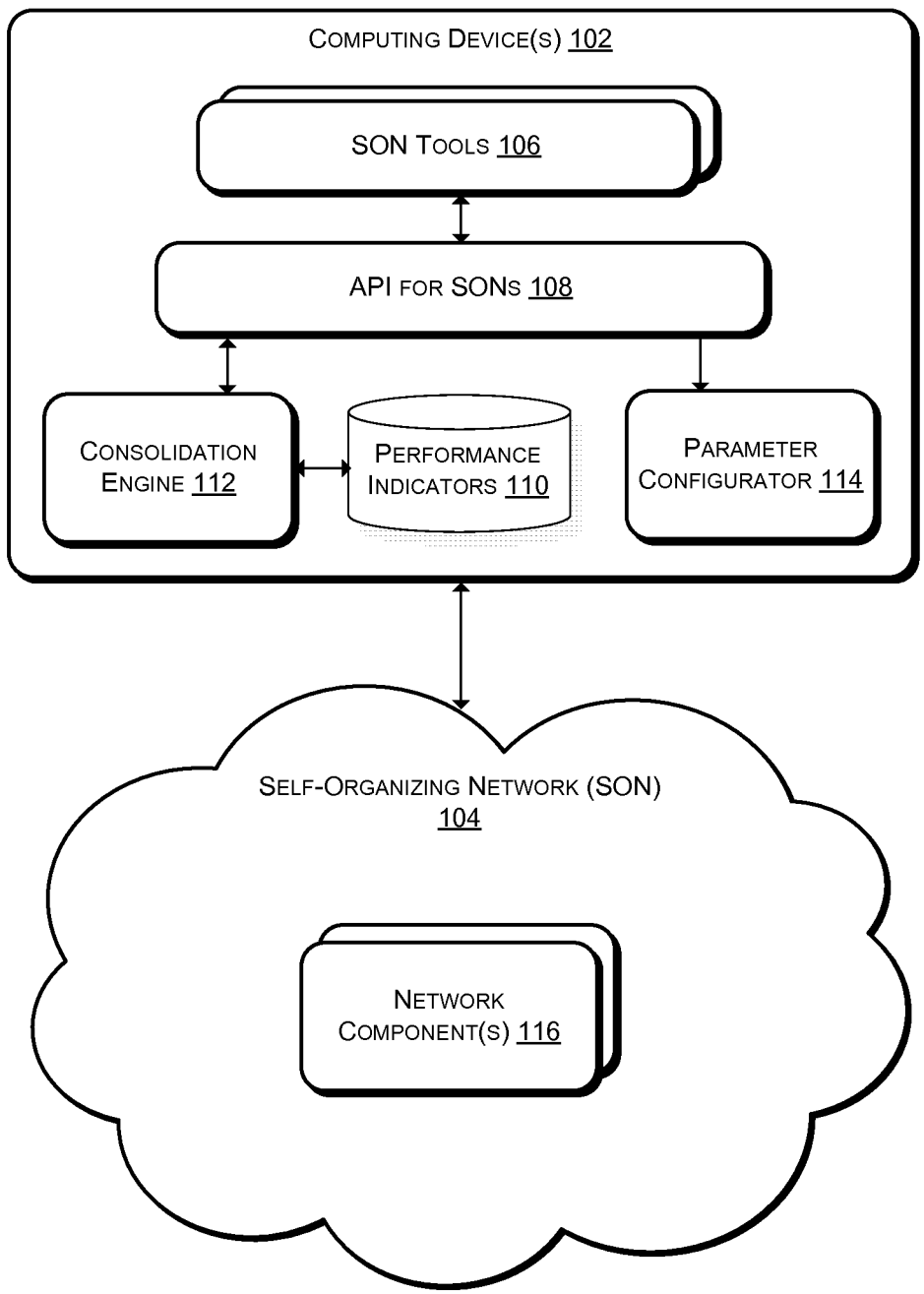
FIG. 1 illustrates an overview of a SON with an application programming interface (API) common to a plurality of SON tools, the SON tools receiving performance indicators via the API and performing at least one action based on the performance indicators.

This disclosure describes, in part, an API for SONs that is common to at least a plurality of SON tools of a specific SON. The API enables multiple SON components to each focus on a purpose (e.g., data consolidation, visualization, etc.) while communicating with each other to accomplish an overall SON plan. Thus, one component may gather network information and determine performance indicators and another may receive updated network configurations and configure network components, and a SON tool may receive performance indicators and provide updated network configurations to those components using the API or perform at least one action based on the performance indicators. The SON tool may also or instead be triggered by another SON component and perform an action, such as restoring a parameter to a specific value following a parameter consistency check, without respect to the performance indicators.

Additionally, the API may be extended by new SON tools, and the SON may include a SON automation engine to receive the new SON tools, to integrate the new SON tools into the SON, and to execute the new SON tools. The SON automation engine may handle a range of tasks for SON tools, significantly reducing the amount of development required for a given SON tool. In some implementations, the SON automation engine may receive specification of SON tools from developers through, for example, a SON portal.

The disclosure further describes one or more SON tools configured to receive information indicating that access network equipment is experiencing a power outage. The received information may be an alert received by the SON tool(s) indicating the power outage or may be performance indicators utilized by the SON tool(s) to determine the occurrence of the power outage. In response, the SON tool(s) determine at least one of a time since the power outage, a present configuration of the access network equipment, a characteristic of the access network equipment, or a value of a performance indicator associated with the access network equipment. Based on that determination, the SON tool(s) then generates an updated configuration of the access network equipment and provide the updated configuration to the access network equipment. If the power outage continues over a time period, the SON tool(s) may periodically repeat the determination, the generating of an updated configuration, and the providing of that updated configuration, progressively applying changes to the configuration of the access network equipment which degrade service capabilities of access network equipment and save power of access network equipment.

In some implementations, the SON tool(s) receive the information and provide the updated configuration through an API of the SON, such as the API described in greater detail herein. That API may connect the SON tool(s) and other SON components.

In various implementations, the access network equipment may include a base station, a node B, and eNode B, or an access point which has either lost a primary power supply or experienced a decrease of its power supply resources below a threshold. Such access network equipment may have a main power supply, a backup power supply, such as a battery or series of batteries, and a generator run on fuel. The access network equipment may expose or report performance indicators for the main power supply, battery level, fuel level, generator status, backup power supply status, etc. to the SON. The access network equipment may also expose or report other performance indicators, such as a signal-to-noise ration, a bit error rate, a frame error rate, a number of carriers, a number of connections, cellular technology types of the connections, a maximum transmit power, or a maximum bit rate. In response to receiving an updated configuration from the SON, the access network equipment may turn off air conditioning, turn off a main power supply, adjust a voltage of a backup power supply, disconnect 2G, 3G, 4G/LTE, or other cellular or wireless services, shut down one or more carriers, reduce a maximum transmit power, or adjust a maximum bit rate. As noted above, these changes may be applied progressively, over time, as the power outage continues.

Overview

FIG. 1 illustrates an overview of a SON with an application programming interface (API) common to a plurality of SON tools, the SON tools receiving performance indicators via the API and performing at least one action based on the performance indicators. As illustrated, one or more computing devices 102 associated with a SON 104 may be configured with SON tools 106 that utilize an API for SONs 108 which is common to the multiple SON tools 106. The SON tools 106 receive performance indicators 110 associated with network information via the API 108, the performance indicators 110 having been determined by a consolidation engine 112. The SON tools 106 perform at least one action based on the performance indicators 110, such as generating updated network configurations based on the performance indicators 110 and providing the updated network configurations via the API 108 to a parameter configurator 114. The parameter configurator 114 then configures one or more network components 116 of the SON 104 by, for example, updating parameters of the network component(s) 116.

Figure 4:
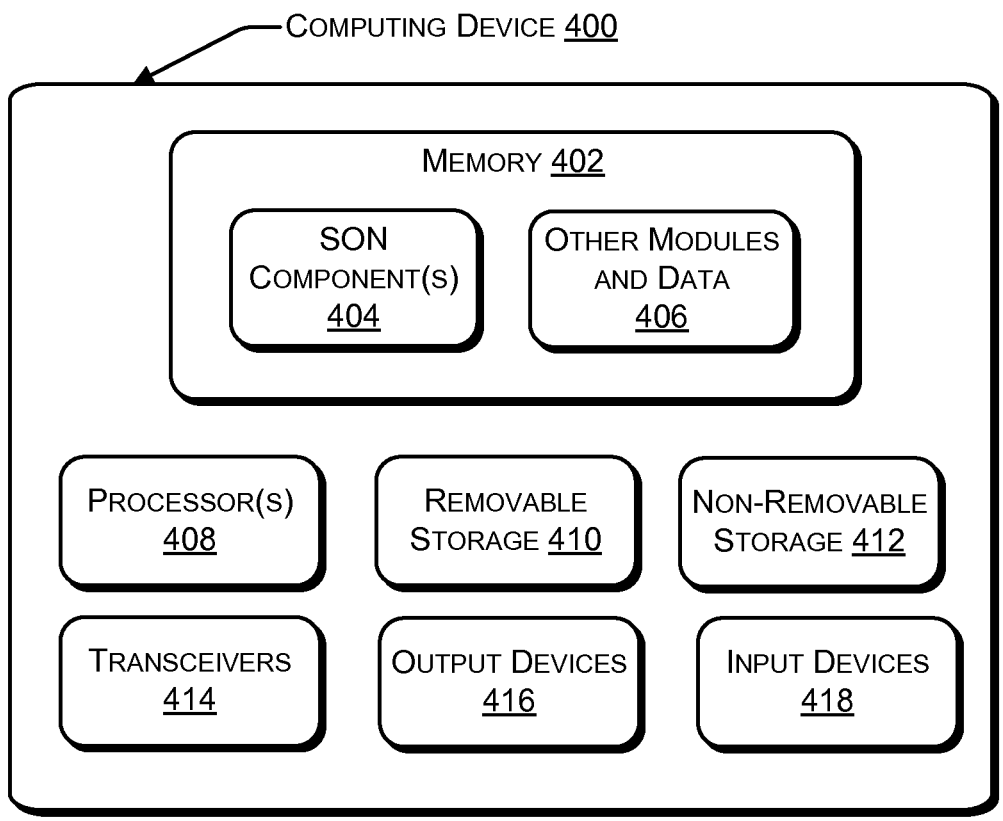
FIG. 4 illustrates a component level view of a computing device configured to implement one or more SON components.

In various implementations, the computing device(s) 102 may each be or include a server or server farm, multiple, distributed server farms, a mainframe, a work station, a personal computer (PC), a laptop computer, a tablet computer, an embedded system, or any other sort of device or devices. In one implementation, the computing device(s) 102 represent a plurality of computing devices working in communication, such as a cloud computing network of nodes. The computing device(s) 102 may belong to the SON 104 or may be external to but in communication with the SON 104. An example computing device 102 is illustrated in FIG. 4 and is described in detail below with reference to that figure.

The SON 104 may be any sort of network configured by SON components to perform at least one of self-configuring, self-optimizing, or self-healing. Such SON components are illustrated in FIG. 1 by elements 106-114. For example, the SON 104 may be a radio access network, such as a telecommunication network, a smart energy grid network, or a medical health network. The network component(s) 116 of the SON 104 may be subnetworks, devices, or modules capable of being initialized or configured by the SON components 106-114. For example, when the SON 104 is a telecommunication network, such as a 2G, 3G, 4G/LTE network, or other cellular or wireless network, the network component(s) 116 may be base stations (e.g., Node Bs or eNode Bs), radio network controllers (RNCs), an operations support system (OSS), a word order system, or other network element(s). Information about the SON 104 (referred to herein as "network information"), such as measurements or parameters, may also be provided by the network component(s) 116, or may instead be provided by other sources within the SON 104. For example, the network information may be provided by any or all of a trouble ticket system, radio traces, core network traces, from an OSS, or from one or more other network elements. Depending on the purpose(s) of the SON 104 (e.g., telecommunications, energy, medical health), the SON 104 may include any number of different subnetworks, devices, and modules specific to the purpose(s) of the SON 104 and may be in communication with any number of devices external to the SON 104.

In some implementations, the consolidation engine 112 may be a SON component whose purpose to receive or retrieve network information and to determine performance indicators 110 based on that network information. The consolidation engine 112 may have ongoing, periodic, or event-driven connections to sources of network information of the SON 104, and the consolidation engine 112 receives or retrieves the network information via those connections.

Upon receiving the network information, the consolidation engine 112 utilizes a store of performance indicators 110, such as key performance indicators, associated with the API 108 to determine new/updated performance indicators 110. The store of performance indicators 110 may be any sort of database, file, or data structure. Also, the store of performance indicators 110 may be associated with a schema, and the schema may be extended, along with the API 108, in response to the addition of new SON tools 106. Based on the schema, the stored performance indicators 110, and the received or retrieved network information, the consolidation engine 112 determines new/updated performance indicators 110 and stores those new/updated performance indicators 110 in the store of performance indicators 110. New performance indicators 110 may be generated by the consolidation engine 112 responsive to a request to generate a performance indicator 110 that was received by the consolidation engine 112 from a SON tool 106. In some implementations, this may involve filtering out redundant or non-utilized network information.

The consolidation engine 112 may then automatically provide the determined performance indicators 110 to one or more of the SON tools 106 by utilizing the API 108 to invoke the one or more SON tools 106. The SON tools 106 invoked may be a function of which performance indicators 110 have been added or updated. In other implementations, rather than automatically invoking SON tools 106, the consolidation engine 112 may be queried for performance indicators 110 by the SON tools 106 via the API 108.

In various implementations, the API 108 is an API for SONs that may be standardized and shared among multiple SONs. When standardized, the API 108 may expose at least one of standardized methods/procedures or standardized parameters, such as performance indicators 110. In other implementations, the architecture utilizing the API 108 may be standardized among multiple SONs, but the API 108 may be specific to the SON 104, including methods/procedures and parameters/performance indicators 110 that are specific to the SON tools 106. For example, an SON tool 106 may have a method to invoke that SON tool 106 to generate an updated network configuration, and the method may be associated with specific performance indicators 110 that are to be provided when calling the method. Such a method may be part of the API 108. Likewise, the consolidation engine 112 may provide a query method for retrieving performance indicators 110, the query method having as parameters the identifiers of the performance indicators 110 being sought by the query. Such a query method may also be part of the API 108. In addition, the API 108 may include methods for providing data to or for receiving or retrieving data from any of the SON components 106-114. In some implementations, the API 108 may include methods for alerts or alarms that may be utilized by the SON tools 106 to receive notifications that, for example, a performance indicator 110 exceeds a threshold. Also, while the API 108 is illustrated as a separate SON component, it is to be understood that the methods/processes associated with the API 108 are methods/processes of the other SON components 106 and 110-114 and that API 108 may simply be a logical representation, not a separate module of code or hardware device.

In some implementations, the SON tools 106 may each be responsible for performing some task associated with self-configuration, self-optimization, or self-healing of the SON 104 resulting, for example, in the generation of an updated network configuration by that SON tool 106. The SON tools 106 may also each invoke, via the API 108, a SON component to perform an action based on the performance indicators 110, invoke, via the API 108, an engineering tool based on the performance indicators 110, pass, via the API 108, information associated with the performance indicators 110 to a SON component, sending, via the API 108, a notification associated with the performance indicators 110, or generate of a report based on the performance indicators 110.

The updated network configuration may simply be an update to a single parameter of a single network component 116 or may represent a more comprehensive configuration of multiple parameters of multiple network components 116. A SON tool 106 may be invoked by the consolidation engine 112 and receive performance indicators 110 or may invoke a query method of the API 108 associated with the consolidation engine 112 to receive or retrieve performance indicators 110. A SON tool 106 may also be invoked by another SON tool 106 through the API 108, and those SON tools 106 may collaborate.

Using the performance indicators 110, the SON tool 106 may generate an updated network configuration and invoke a method of the API 108 associated with the parameter configurator 114 to provide the parameter configurator with the updated network configuration. For example, the SON tool 106 may be a rehoming tool and may receive a performance indicator 110 which notifies the SON tool 106 that an RNC has been added for a geographic area. In response, the SON tool 106 may generate an updated network configuration which reassigns a number of base stations that are currently associated with one RNC to the new RNC.

Examples of SON tools 106 may include any or all of an automated report generating tool, a parameter consistency check tool, a real-time alert tool, a mobility evaluation tool, a coverage and interference management tool, a network outage tool, a network configuration tool, a load distribution tool, a spectrum carving tool, or a special events tool. Additionally or instead, the SON tools 106 may include any or all of a performance management tool, a radio frequency (RF) planning tool, an automatic frequency planning tool, a rehoming tool, an automatic cell planning tool, or a geolocation tool.

In some implementations, SON tools 106 may perform actions without respect to performance indicators 110. The SON tools 106 may be triggered by other SON components and may perform an action, such as resetting a parameter, without needing to receive or retrieve performance indicators 110.

In various implementations, the parameter configurator 114 may be invoked by a SON tool 106 and provided, via the API 108, with an updated network configuration. Alternatively, the parameter configurator 114 may invoke a SON tool 106 to retrieve an already prepared, updated network configuration or to have the SON tool 106 generate and provide an updated network configuration. Upon retrieving or receiving the updated network configuration, the parameter configurator 114 configures one or more network components 116 with the updated network configuration. As mentioned above, this may involve adjusting one or more parameters or network component(s) 116. Example network component(s) 116 are described above in further detail.

Example Environment

Figure 2:
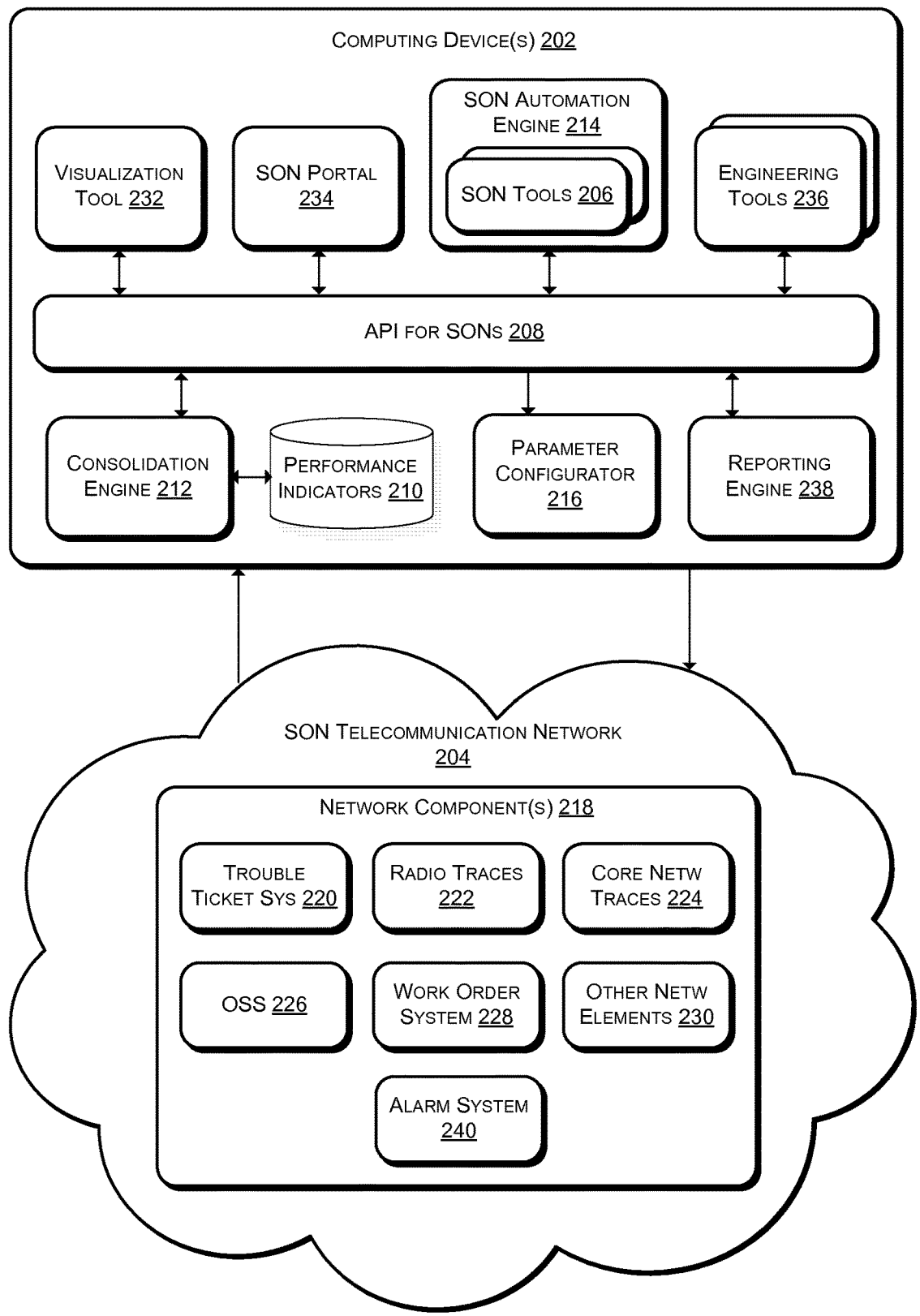
FIG. 2 illustrates an example environment including multiple SON components for a telecommunication network, the multiple SON components sharing a common API and each performing some aspect of planning, configuring, managing, optimizing, or healing the telecommunication network in an automated fashion. The API enables further SON components to be added or modified.

FIG. 2 illustrates an example environment including multiple SON components for a telecommunication network, the multiple SON components sharing a common API and each performing some aspect of planning, configuring, managing, optimizing, or healing the telecommunication network in an automated fashion. The API enables further SON components to be added or modified. As illustrated, one or more computing devices 202 associated with a SON telecommunication network 204 may be configured with SON tools 206 that utilize an API for SONs 208 which is common to the multiple SON tools 206. The SON tools 206 receive performance indicators 210 associated with network information via the API 208, the performance indicators 210 having been determined by a consolidation engine 212. A SON automation engine 214 executes the SON tools 106, causing the SON tools 106 to perform an action based on the performance indicators 210, such as generating updated network configurations based on the performance indicators 210 and provide the updated network configurations via the API 208 to a parameter configurator 216. The parameter configurator 216 then configures one or more network components 216 of the SON telecommunication network 204 by, for example, updating parameters of the network component(s) 218. Example network component(s) 218 may include a trouble ticket system 220, radio traces 222, core network traces 224, an OSS 226, a work order system 228, one or more other network elements 230, or an alarm system 240.

In addition, the SON components illustrated in FIG. 2 include a visualization tool 232 to generate visualizations based on the performance indicators 210, a SON portal 234 to display the visualizations, to enable user collaboration regarding the SON telecommunication network 204, and to enable developer specification of SON tools 206, engineering tools 236, and a reporting engine 238. The engineering tools 236 may be invoked by SON tools 206 to participate in self-configuring, self-optimizing, or self-healing the SON telecommunication network 204. The visualization tool 232, SON portal 234, and engineering tools 236 may communicate with each other and with other SON components via the API 208.

The computing device(s) 202 may be similar to or the same as computing device(s) 102. Likewise, SON telecommunication network 204 may be similar to or the same as SON 104, with the difference that SON telecommunication network 204 is specifically identified as a telecommunication network. Network component(s) 218 may also be similar to or the same as network component(s) 116, except that specific network component(s) 220-230 are illustrated and identified in FIG. 2. Those network component(s) 218—a trouble ticket system 220, radio traces 222, core network traces 224, an OSS 226, a work order system 228, one or more other network elements 230, and alarm system 240—are also mentioned above with respect to network component(s) 116 as examples of network component(s) 116 that may be associated with SON 104 when SON 104 is a telecommunication network. These network component(s) 218 and other sources of network information may provide network information to the consolidation engine 212 and receive updated network configurations from the parameter configurator 216.

In some implementations, the SON tools 206, API 208, performance indicators 210, consolidation engine 212, and parameter configurator 216 may be similar to or the same as SON tools 106, API 108, performance indicators 110, consolidation engine 112, and parameter configurator 114, and what is written above with respect to these SON components 106-114 may also apply to SON components 206-212 and 216, except as distinguished in describing FIG. 2.

In various implementations, the visualization tool 232 may be invoked by or may query the consolidation engine 212 via the API 208, and the visualization tool 232 may receive performance indicators 210 as a result of the invoking or querying. The visualization tool 232 may receive the performance indicators 210 periodically or on an event-driven basis as a result, for example, of performance indicators meeting a threshold or model specified by a rule of the visualization tool 232 or the consolidation engine. For instance, the visualization tool 232 may have a rule specifying that the visualization tool 232 is to receive notification if a performance indicator 210 exceeds a certain threshold, and the consolidation engine 212 may expose, via the API 208, an alert or alarm method that the visualization tool 232 may register for. In such an instance, responsive to registration by the visualization tool 232, the visualization tool 232 may be invoked to receive an alert or alarm when the performance indicator 210 exceeds the threshold.

In some implementations, the visualization tool 232 generates visualizations based on the performance indicators 210, alerts, or alarms. These visualizations may graphically convey information about the SON telecommunication network 204 and may be displayed to a user. In order to provide the visualizations to users, the visualization tool 232 may provide the visualizations to the SON portal 234, which may display the visualizations, or may provide them to another device for display, such as a server or an end user device. The SON portal 234 or device that the visualization is shared with may be a function of configuration of the visualization tool 232.

Also, in further implementations, the visualization tool 232 may invoke the SON automation engine 214 or a particular SON tool 206 executed by that SON automation engine 214 based on rules or user input. Such rules may direct the visualization tool 232 to invoke the SON automation engine 214 or SON tool 206 when a performance indicator 210 meets a threshold or model or when an alert or alarm is received. User input, received in response to providing a visualization, may also cause the visualization tool 232 to invoke the SON automation engine 214 or SON tool 206.

In various implementations, the SON portal 234 may be a user-facing component for displaying information, enabling collaboration of users, and enabling specification by users of SON tools 206. The SON portal 234 may receive, via the API, visualizations from the visualization tool 232 and may provide those visualization to a user device through, for example, web page. The SON portal 234 may also receive other network information or performance indicators 210 via the API 208 from any of the SON components, such as the consolidation engine 212 or the visualization engine 232. The SON portal 234 may also receive user input in return and may provide that user input to a SON tool 206 or to the visualization engine 232 to utilize in performing an action or in further visualizations.

The SON portal 234 may also include a collaboration engine or other social network component which enables users to communicate about the SON telecommunication network 204, including discussing problems with the SON plan implemented by the SON telecommunication network 204 and suggestions for improving that plan. In some implementations, the SON portal 234 may even enable users to vote on a number of suggested improvements to the SON plan, and the improvement with the highest plurality of votes may be implemented by developers associated with the SON telecommunication network 204 specifying a new SON tool 206.

In further implementations, the SON portal 234 enables specification of SON tools 206. The SON portal 234 may offer a user interface for textual or graphical specification of a new SON tool 206. Such a user interface may simply accept textually-specified code for a SON tool 206, or may even allow a user to select graphical representations of SON components (e.g., a graphical representation of the consolidation engine 212) to cause automatic specification of code for accessing the SON component through the API 208. Also, the SON portal 234 may automatically specify or update SON tools 206 based on user comments. For example, a SON tool 206 may have a threshold at which user devices are reassigned to different access networks to avoid congestion. If there are sufficient complaints of congestion, the SON portal 234 may update that threshold to better avoid congestion.

In various implementations, the SON automation engine 214 may execute any one or more of the SON tools 206 in response to being invoked through the API 208 or in response to the SON tool 206 being invoked, receiving an alarm or alert, etc. The SON automation engine 214 may handle a number of execution-related functions for SON tools 206, such as memory allocation and release, calls to system components, etc. Also, the SON automation engine 214 may receive specifications of SON tools 206 from the SON portal 234, compile those specifications if compiling is needed, and execute those SON tools 206.

The SON automation engine 214 may also provide an API 208 for SON tools 206 such that SON tools 206 utilize the API 208 of the SON automation engine 214 rather than extending the API 208 with their own method/procedures. In such an implementation, the API 208 may be relatively stable, with each of the consolidation engine 212, visualization tool 232, SON portal 234, engineering tools 236, reporting engine 238, parameter configurator 214, and SON automation engine 214 having their own method/procedure and performance indicators/parameters. Such a relatively stable API 208 may significantly reduce the burden on developers.

In further implementations, the engineering tools 236 may participate with SON tools 206 in self-configuring, self-optimizing, or self-healing the SON telecommunication network 204. The engineering tools 236 may even be SON tools themselves, operating independently and without need of execution by the SON automation engine 214. As with other SON components, the engineering tools 236 may receive or retrieve data through, and provide output to, the API 208. Example engineering tools 236 may include at least one of a performance management tool, a RF planning tool, an automatic frequency planning tool, a rehoming tool, an automatic cell planning tool, or a geolocation tool. Each engineering tool 236 may provide output used by other engineering tools 236 or by SON tools 206.

The reporting engine 238 may participate with the SON tools 206 in generating reports. The reporting engine 238 may even be a SON tool itself, operating independently and without need of execution by the SON automation engine 214. As with other SON components, the reporting engine 238 may receive or retrieve data through, and provide output to, the API 208.

In some implementations, while the SON automation engine 214, visualization tool 232, SON portal 234, engineering tools 236, and reporting engine are illustrated in FIG. 2 in connection with a SON telecommunication network 204, the SON automation engine 214, visualization tool 232, SON portal 234, engineering tools 236, and reporting engine 238 may also be associated with other types of SONs.

Example Environment Including SON Mechanism for Energy Saving

Figure 3:
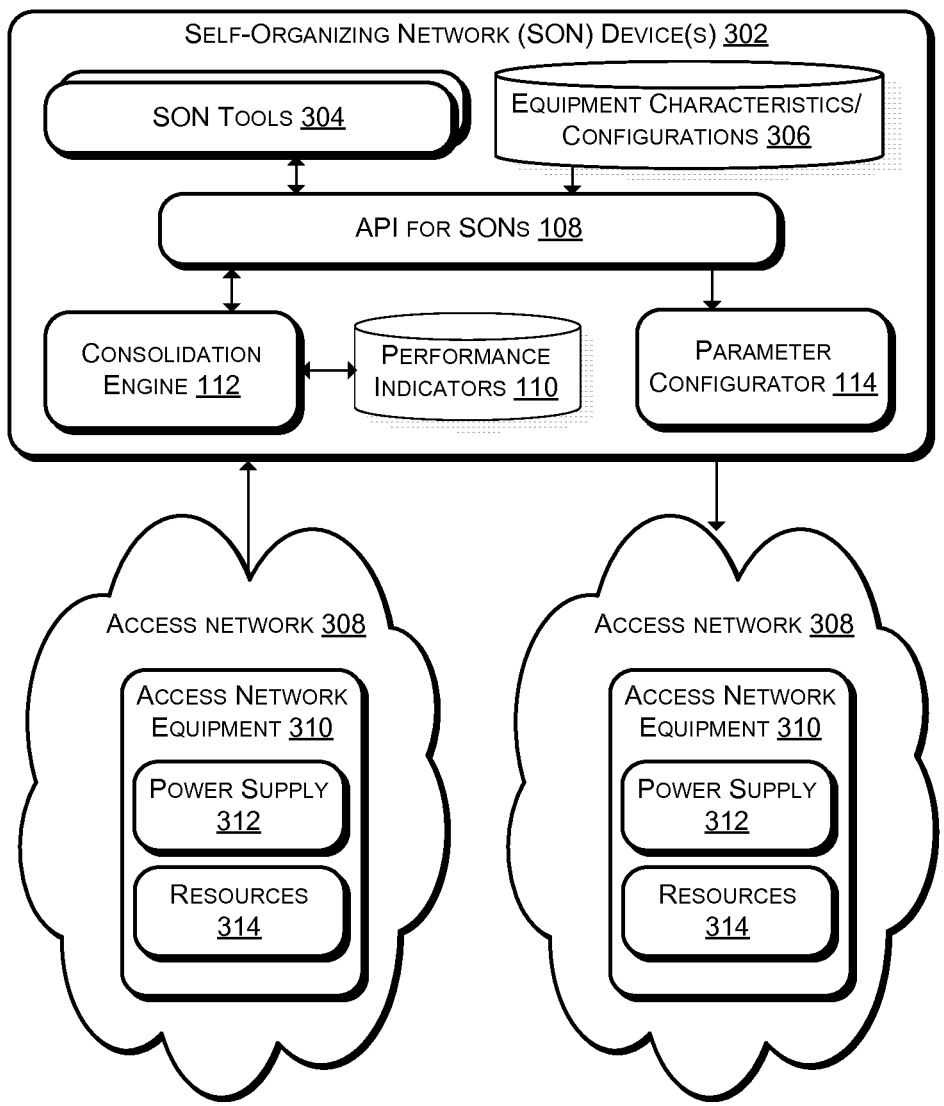
FIG. 3 illustrates a further example environment including SON device(s), which may include one or more SON tools, configured to receive information indicating that access network equipment is experiencing a power outage and to generate an updated configuration for the access network equipment based on at least one of a time since the power outage, a present configuration of the access network equipment, a characteristic of the access network equipment, or a value of a performance indicator associated with the access network equipment.

FIG. 3 illustrates a further example environment including SON device(s), which may include one or more SON tools. The SON device(s) may be configured to receive information indicating that access network equipment is experiencing a power outage and to generate an updated configuration for the access network equipment. As illustrated, one or more SON devices 302 may include one or more SON tools 304, an equipment characteristics/configuration data store 306 (hereinafter "equipment data store 306"), an API 108, a data store for performance indicators 110, a consolidation engine 112, and a parameter configurator 114. The SON tool(s) 304 may receive SON alerts or performance indicators 110 associated with one or more access networks 308. The SON alerts or performance indicators 110 may indicate that access network equipment 310 of the access network(s) 308 is experiencing a power outage. For example, a power supply 312 or other resources 314 of the access network equipment 310 may manifest a loss of power, and that loss may be retrieved by or reported to the SON device(s) 302.

In various implementations, the SON tool(s) 304 may comprise one or more SON tools, such as one or more of SON tools 106 or SON tools 206. SON tool(s) 304 may include a plurality of modules associated with different capabilities of the SON tool(s) 304. For example, the SON tool(s) 304 could include a module for receiving information indicative of a power outage, a module for determining equipment and outage data, such as time since the outage, configurations, characteristics, performance indicators, etc., a module for determining and generating an updated configuration for the access network equipments, and a module for providing that updated configuration. In some implementations, the SON tool(s) 304 may interact with each other and with other components of the SON device(s) 302 through the API 108, which is described above in greater detail. In other implementations, the SON tool(s) 304 and the SON device(s) 302 may not utilize the API 108. Also, while not illustrated, the SON tool(s) 304 may be executed by a SON automation engine, such as SON automation engine 214.

The SON tool(s) 304 are executed on the SON device(s) 302. The SON device(s) 302 may be an example of the computing device 102, which, as mentioned above, may include other SON tools 106, an API for SONs 108, performance metrics 110, a consolidation engine 112, and a parameter configurator 114. Alternatively, SON device(s) 302 could instead be an example of the computing device 202. In other implementations, the SON device(s) 302 may rather be another computing device or devices which may include the SON tool(s) 304, the equipment data store 306, and the performance indicators 110 without the API 108, consolidation engine 112, parameter configurator 114, or other SON components.

In various implementations, the SON tool(s) 304 may receive an alert from another component of the SON device(s) 302 or from an OSS. Such a component or OSS may receive performance indicators or other information from the access network equipment 310 of the access network(s) 308, either by retrieving that information or by receiving reports generated by the access network equipment 310. Based on the received performance indicators or other information, the component or OSS may generate an alert, and the SON tool(s) 304 may receive that alert. The SON tool(s) 304 may subscribe to such alerts, periodically poll the component or OSS for the alerts, or may otherwise have such alerts sent to them by the component or OSS.

In alternative or additional implementations, the SON tool(s) 304 may receive performance indicators, such as performance indicators 110, either through the API 108 and consolidation engine 112 or from the access network equipment 310 and any intervening components. Examples of such performance indicators include a main power supply status, a battery level, a fuel level, a generator status, or a backup power supply status. The SON tool(s) 304 may retrieve the performance indicators from the consolidation engine 112 or from the access network equipment 310 or receive such performance indicators. Upon retrieving or receiving the performance indicators, the SON tool(s) 304 may determine the existence of a power outage at access network equipment 310. The SON tool(s) 304 may determine the existence of the power outage based on a comparison of the performance indicators to one or more thresholds or models.

Upon receiving information indicating the occurrence of a power outage at access network equipment 310, the SON tool(s) 304 may determine equipment and outage data. For example, the SON tool(s) 304 may determine a time since the information indicating the outage was received. Alternatively, if the time at which the outage occurred in received with the information indicating the outage, the SON tool(s) 304 may use that time. The SON tool(s) 304 may then either calculate an amount of time passed since the determined or received time. In some implementations, the SON tool(s) 304 may run a timer starting at the determined or received time.

In further implementations, determining the equipment or outage data may include the SON tool(s) 304 retrieving a present configuration of the access network equipment 310 experiencing the power outage or a characteristic of the access network equipment 310 experiencing the power outage. The present configuration may include thresholds or rules relating to the number of carriers, the maximum bit rate, available cellular technologies (e.g., 2G, 3G, 4G/Long Term Evolution (LTE) network, or other cellular or wireless network), etc. The characteristic may be any of backup power supply resources at the access network equipment 310, cellular technologies supported, etc. The SON tool(s) 304 may retrieve the present configuration or characteristic from the access network equipment 310. Alternatively or additionally, the SON tool(s) 304 may retrieve the present configuration or characteristic from the equipment data store 306, which may be any sort of data store and may store one or both of configurations and characteristics for multiple instances of access network equipment 310.

In some implementations, determining the equipment or outage data may include the SON tool(s) 304 receiving or retrieving values of performance indicators (also referred to herein as receiving or retrieving performance indicators), such as performance indicators 110. For example, the SON tool(s) 304 may receive or retrieve the performance indicators 110, which may be any of various KPIs, from the consolidation engine 112. Additionally or instead, the SON tool(s) 304 may retrieve the performance indicators from the access network equipment 310. As mentioned above, examples of performance indicators may include a main power supply status, a battery level, a fuel level, a generator status, or a backup power supply status. In some implementations, the performance indicators may have previously been received or retrieved as information indicating an outage.

In various implementations, the SON tool(s) 304 may then determine one or more configuration changes to apply to the access network equipment 310 based on the determined equipment and outage data and may generate an updated configuration reflecting those configuration changes. Some examples of configuration changes that may be reflected in an updated configuration may cause the access network equipment 310 to turn off air conditioning, turn off a main power supply, adjust a voltage of a backup power supply, disconnect 2G, 3G, 4G/LTE, or other cellular or wireless services, shut down one or more carriers, reduce a maximum transmit power, or adjust a maximum bit rate.

In some implementations, the SON tool(s) 304 may determine the configuration changes by applying one or more thresholds or models to the equipment and outage data. The SON tool(s) 304 may then select one or more configuration changes based on associations of those configuration changes with the thresholds or models. For example, for a first pair of a specific time since the outage and a specific battery level, the SON tool(s) 304 may determine first configuration changes, and for a second pair of another specific time since the outage and another specific battery level, the SON tool(s) 304 may determine second configuration changes. Such thresholds or models may be included in policies of a telecommunication service provider associated with the SON device(s) 302.

Additionally or instead, the SON tool(s) 304 may determine the configuration changes by selecting a configuration change template from a plurality of configuration change templates based at least in part on the determined equipment and outage data. Different thresholds may have different criteria, and the SON tool(s) 304 may select the configuration change template that has criteria which best match the equipment and outage data. For example, there may be a template specific to outages lasting longer than one day and battery levels lower than fifty percent.

Upon determining the configuration changes, the SON tool(s) 304 may generate an updated configuration reflecting those configuration changes.

In various implementations, the SON tool(s) 304 may then updated configuration to the access network equipment 310. Further, in a number of implementations, the SON tool(s) 304 may provide the update configuration through the parameter configurator 114 and may interface with the parameter configurator 114 through the API 108.

In some implementations, the SON tool(s) 304 periodically ascertains whether the power outage is still ongoing. If the outage is still ongoing, the SON tool(s) 304 may again determine equipment and outage data, determine configuration changes based on that equipment and outage data, generate an updated configuration reflecting the configuration changes, and provide the updated configuration. With each repeat, the SON tool(s) 304 may disable or impair more features of the access network equipment 310 to save additional power and prolong the time that the access network equipment 310 remains in operation. In this way, the SON tool(s) 304 may apply configuration changes progressively, over time, thus balancing service availability and service longevity.

After the power outage, the SON tool(s) 304 may, in some implementations, return the configuration of the access network equipment 310 to its state before the power outage. A configuration corresponding to that previous state may be obtained by the SON tool(s) 304 from the equipment data store 306.

In various implementations, the access network(s) 308 may be any sort of access networks, such as radio access networks utilizing licensed spectrum or wireless networks utilizing unlicensed spectrum. The access network(s) 308 may be access networks of a telecommunication network, such as macrocells, microcells, picocells, or femtocells. Each access network 308 may include access network equipment 310, which may be a base station, a Node B, an eNode B, or a WiFi access point. Each access network 308 may also include additional equipment, such as radio network controllers (RNCs), etc.

The access network equipment 310 may include antennas and other communication equipment which may be disposed to provide an area of coverage. For example, the access network equipment 310 may include a tower mounting the antennas and communication equipment. Such antennas and communication equipment may be examples of resources 314. The access network equipment 310 may also include power supplies 312, such as a primary power supply and a backup power supply. The primary power supply may be A/C power, and the backup power supply may include a battery or other backup power source. In some embodiments, the power supply 312 may also include a generator and fuel source to recharge the backup power supply. Examples of access network equipment 310 provisioned with power supplies 312 are described in greater detail in U.S. Pat. No. 8,005,510, which is entitled "Cell Site Power Conservation" and issued on Jul. 10, 2008; U.S. Pat. No. 8,279,074, which is entitled "Battery Monitoring System, Such As For Use In Monitoring Cell Site Power Systems"

and issued on Oct. 2, 2012; and U.S. Pat. No. 8,729,732, which is entitled "Cell Site Power Generation" and issued on May 20, 2014.

In various implementations, the power supplies 312 and resources 314 may expose or report performance indicators, such as battery level, a fuel level, a generator status, a backup power supply status, a signal-to-noise ration, a bit error rate, a frame error rate, a number of carriers, a number of connections, cellular technology types of the connections, a maximum transmit power, or a maximum bit rate. These performance indicators may be periodically reported to SON device(s) 302 or may be retrieved by the SON device(s) 302. In some implementations, the access network equipment 310 may provide an API to the power supplies 312 and resources 314 to enable querying for the values of the performance indicators.

In further implementations, the access network equipment 310 may receive updated configuration(s) from the SON device(s) 302 and may apply the configuration changes reflected by the update configuration(s). The configuration changes may, for example, cause the access network equipment 310 to perform at least one of turning off air conditioning, turning off a main power supply, adjusting a voltage of a backup power supply, disconnecting 2G, 3G, 4G/LTE, or other cellular or wireless services, shutting down one or more carriers, reducing a maximum transmit power, or adjusting a maximum bit rate.

Example Device

FIG. 4 illustrates a component level view of a computing device configured to implement one or more SON components. As illustrated, the computing device 400 comprises a system memory 402 storing one or more SON components 404 and other modules and data 406. Also, the computing device 400 includes processor(s) 408, a removable storage 410, a non-removable storage 412, transceivers 414, output device(s) 416, and input device(s) 418.

In various implementations, system memory 402 is volatile (such as RAM), non-volatile (such as ROM, flash memory, etc.) or some combination of the two. The SON component(s) 404 may be any one or more of the SON tools 106, the API 108, the performance indicator store 110, the consolidation engine 112, or the parameter configurator 114 described above in detail with regard to FIG. 1. The SON component(s) 404 may also or instead be any one or more of the SON tools 206, the API 208, the performance indicator store 210, the consolidation engine 212, the SON automation engine 214, the parameter configurator 216, the visualization tool 232, the SON portal 234, or the engineering tools 236 described above in detail with regard to FIG. 2. Further, the SON component(s) may also or instead be any one or more of the SON tools 304 or the equipment characteristics/configurations 306 described above in detail with regard to FIG. 3. The other modules or data 406 stored in the system memory 402 may comprise any sort of applications or platform components of the computing device 400, as well as data associated with such applications or platform components.

In some implementations, the processor(s) 408 is a central processing unit (CPU), a graphics processing unit (GPU), or both CPU and GPU, or any other sort of processing unit.

Non-transitory computer-readable media may include volatile and nonvolatile, removable and non-removable tangible, physical media implemented in technology for storage of information, such as computer readable instructions, data structures, program modules, or other data. System memory 402, removable storage 410 and non-removable storage 412 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the computing device 400. Any such non-transitory computer-readable media may be part of the computing device 400.

In some implementations, the transceivers 414 include any sort of transceivers known in the art. For example, transceivers 414 may include a radio transceiver that performs the function of transmitting and receiving radio frequency communications via an antenna. The transceivers 414 may facilitate wireless connectivity between the computing device 400 and various nodes of the SON 104, the SON telecommunication network 204, other SON device(s) 302, or access networks 308. In addition, the transceivers 414 may also include a wireless communication transceiver and a near field antenna for communicating over unlicensed wireless IP networks, such as local wireless data networks and personal area networks (e.g., Bluetooth™ or near field communication (NFC) networks). Further, the transceivers 414 may include wired communication components, such as an Ethernet port, that connect the computing device 400 in a wired fashion to one or more nodes of the SON 104, the SON telecommunication network 204, other SON device(s) 302, or access networks 308.

In some implementations, the output devices 416 include any sort of output devices known in the art, such as a display (e.g., a liquid crystal display), speakers, a vibrating mechanism, or a tactile feedback mechanism. Output devices 416 also include ports for one or more peripheral devices, such as headphones, peripheral speakers, or a peripheral display.

In various implementations, input devices 418 include any sort of input devices known in the art. For example, input devices 418 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 5:
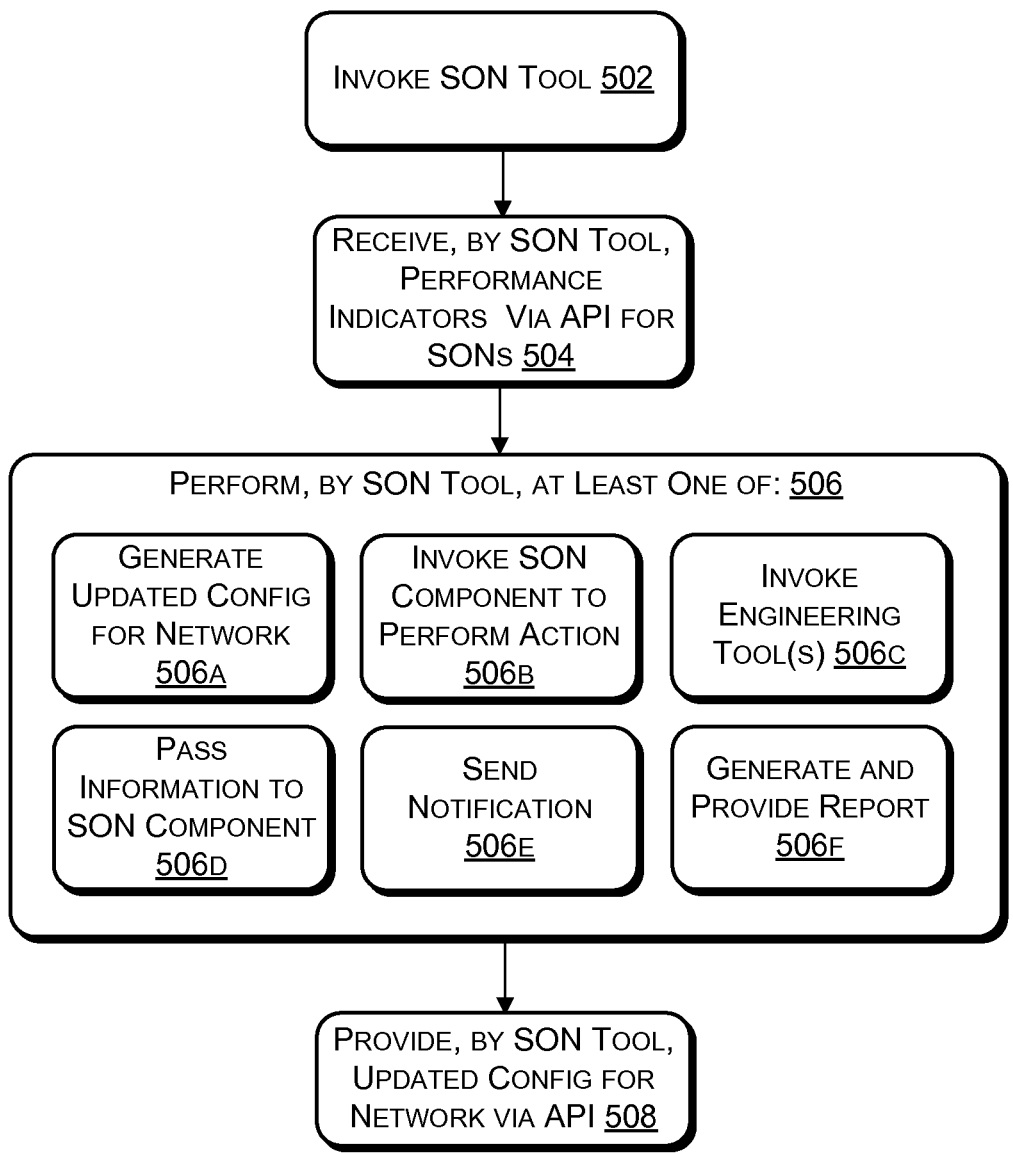
FIG. 5 illustrates an example process for receiving through an API for SONs, by a SON tool, performance indicators and performing at least one action based on the performance indicators.
Figure 6:
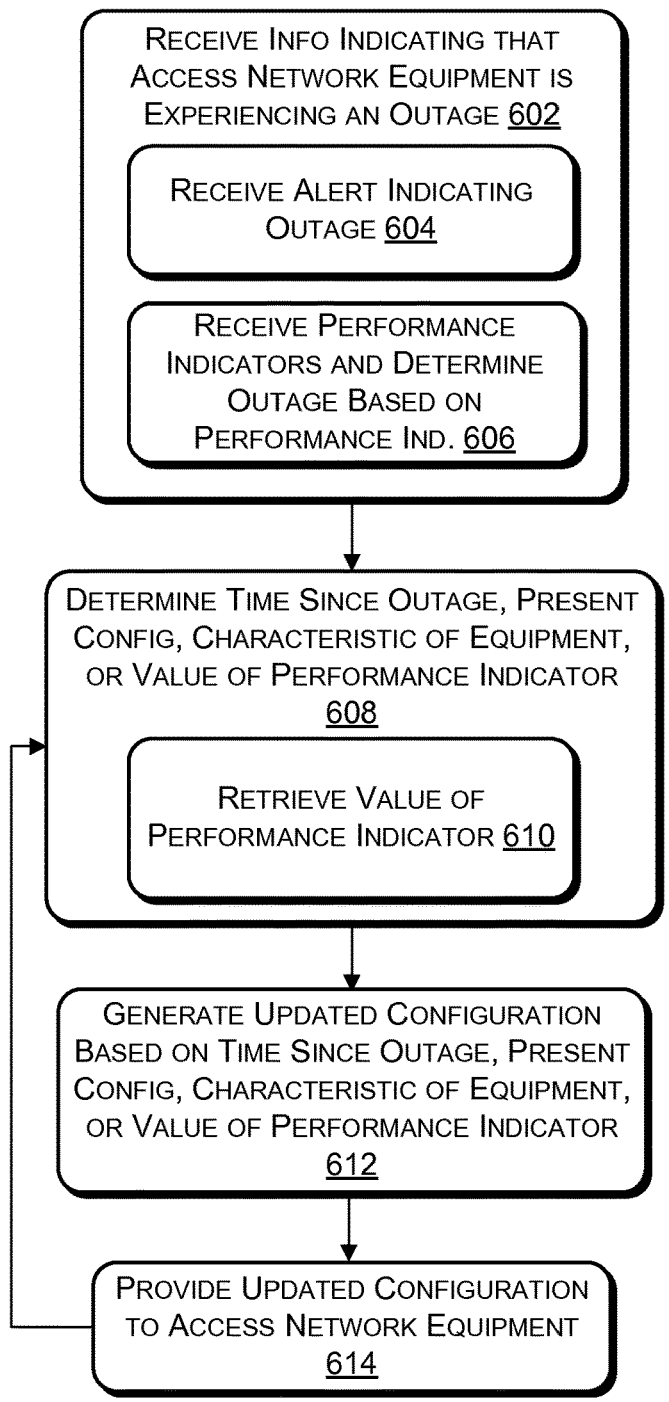
FIG. 6 illustrates an example process for receiving information indicating that access network equipment is experiencing a power outage and generating an updated configuration for the access network equipment based on outage or access network equipment data.

FIGS. 5 and 6 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process for receiving through an API for SONs, by a SON tool, performance indicators and performing at least one action based on the performance indicators. The process includes, at 502, the invoking of a SON tool by one or more of a visualization tool, another SON tool, a consolidation engine, or a SON portal. In other implementations, rather than being invoked, the SON tool may be executed continuously or periodically.

At 504, the SON tool receives one more performance indicators associated with network information, the performance indicators received via an API for SONs that is utilized by a plurality of SON tools. The network information and the one or more network components are associated with one of a telecommunication network, a smart power grid, or a medical health system. In some implementations, the API offers one or more alerts and alarms that may be received by or invoked by the SON tool.

At 506, the SON tool performs at least one action based at least in part on the one or more performance indicators, the at least one action being one of, at 506a, generating an updated network configuration, at 506b, invoking, via the API, a SON component to perform an action, at 506c, invoking, via the API, an engineering tool to perform an action, at 506d, passing, via the API, information to a SON component, at 506e, sending, via the API, a notification, or at 506f, generating a report.

At 508, the SON tool provides the updated network configuration via the API to configure one or more network components. In some implementations, the updated network configuration comprises an update to at least one of the one or more performance indicators.

FIG. 6 illustrates an example process for receiving information indicating that access network equipment is experiencing a power outage and generating an updated configuration for the access network equipment based on outage or access network equipment data. The example process includes, at 602, receiving, by one or more SON tools of a SON, information indicating that access network equipment is experiencing a power outage. The power outage may be either a loss of a main power supply of the access network equipment or a reduction in an available power supply of the access network equipment below a threshold. At 604, the receiving may include receiving, by the one or more SON tools, an alert indicating the power outage. Alternatively or additionally, at 606, the receiving may include receiving, by the one or more SON tools, performance indicators indicative of the power outage and determining based on the received performance indicators, by the one or more SON tools, the existence of the power outage.

At 608, the one or more SON tools may determine, in response to receiving the information, at least one of a time since the power outage, a present configuration of the access network equipment, a characteristic of the access network equipment, or a value of a performance indicator associated with the access network equipment. The characteristic may include backup power resources, cellular technologies supported, or a size of a cell serviced by the access network equipment. The performance indicator may be one of a battery level, a fuel level, a generator status, a backup power supply status, a signal-to-noise ration, a bit error rate, a frame error rate, a number of carriers, a number of connections, cellular technology types of the connections, a maximum transmit power, or a maximum bit rate. At 610, the determining may include retrieving, by the one or more SON tools, the value of the performance indicator from the access network equipment.

At 612, the one or more SON tools may generate an updated configuration of the access network equipment based at least in part on the at least one of the time since the power outage, the present configuration of the access network equipment, the characteristic of the access network equipment, or the value of the performance indicator. The updated configuration may cause the access network equipment to perform at least one of turning off air conditioning, turning off a main power supply, adjusting a voltage of a backup power supply, disconnecting 2G, 3G, 4G/LTE, or other cellular or wireless services, shutting down one or more carriers, reducing a maximum transmit power, or adjusting a maximum bit rate.

At 614, the one or more SON tools may provide the updated configuration to the access network equipment.

In some implementations, the one or more SON tools may periodically repeat the determining at 608, the generating at 612, and the providing at 614 while progressively applying changes to the configuration of the access network equipment which degrade service capabilities of access network equipment and save power of access network equipment. Such repeating may occur after a threshold amount of time passes since the last providing at 614 if the power outage is still ongoing.

Further, in various implementations, the one or more SON tools may receive the information and provide the updated configuration through an API of the SON connecting the one or more SON tools and other SON components.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. A computer-implemented method comprising:
receiving, by one or more self-organizing network (SON) tools executing via a SON automation engine on one or more SON computing devices, information indicating that a base station of a telecommunication network is experiencing a power outage but is continuing to operate on at least one of reduced or backup power due to 1) a loss of a main power supply and a corresponding use of a backup power supply, or 2) an available power level dropping below a threshold, wherein the information is received by the one or more SON tools via an application programming interface (API) for SONs that is exposed to the one or more SON tools by the SON automation engine;
retrieving, by the one or more SON tools via the API from an equipment data store of the one or more SON computing devices, a present configuration of the base station and one or more characteristics of the base station including at least one of backup power resources of the base station, cellular technologies supported by the base station, or a size of a cell serviced by the base station;
receiving, by the one or more SON tools via the API from a consolidation engine executing on the one or more SON computing devices, at least one performance indicator associated with the base station, including at least one of a battery level, a fuel level, a generator status, or a backup power supply status;
generating, by the one or more SON tools, an updated configuration of the base station based at least in part on the present configuration of the base station, the one or more characteristics of the base station, and the at least one performance indicator, wherein the updated configuration reduces power requirements of the base station during the power outage; and providing, by the one or more SON tools, the updated configuration to the base station via the API.

2. The computer-implemented method of claim 1, wherein the one or more SON tools receives the information indicating that the base station is experiencing the power outage as an alert from a component of the one or more SON computing devices, wherein the component of the one or more SON computing devices generates the alert based on the at least one performance indicator or other information from the base station.

3. The computer-implemented method of claim 1, wherein the one or more SON tools receives the information indicating that the base station is experiencing the power outage as the at least one performance indicator, and determines that the at least one performance indicator indicates that the base station is experiencing the power outage based on a comparison of the at least one performance indicator to one or more power outage thresholds or models.

4. The computer-implemented method of claim 1, wherein the at least one performance indicator further includes a signal-to-noise ratio, a bit error rate, a frame error rate, a number of carriers, a number of connections, cellular technology types of the connections, a maximum transmit power, or a maximum bit rate.

5. The computer-implemented method of claim 1, wherein the updated configuration causes the base station to perform at least one of turning off air conditioning, turning off a main power supply, adjusting a voltage of a backup power supply, disconnecting 2G, 3G, 4G, LTE, or other cellular or wireless services, shutting down one or more carriers, reducing a maximum transmit power, or adjusting a maximum bit rate.

6. The computer-implemented method of claim 1, further comprising periodically, by the one or more SON tools, receiving subsequent information indicating that the base station is continuing to experience the power outage, and in response generating subsequent updated configurations and providing the subsequent updated configurations to the base station to progressively degrade service capabilities of the base station to further reduce the power requirements of the base station.

7. The computer-implemented method of claim 1, wherein the one or more SON tools includes a first SON tool configured to receive the information indicating that the base station is experiencing the power outage, a second SON tool configured to perform at least one of retrieving the one or more characteristics of the base station from the equipment data store or receiving the at least one performance indicator, a third SON tool configured to generate the updated configuration, and a fourth SON tool configured to provide the updated configuration to the base station.

8. The computer-implemented method of claim 7, wherein the API allows the first SON tool, the second SON tool, the third SON tool, the fourth SON tool, the equipment data store, and the consolidation engine to communicate within the one or more SON computing devices.

9. One or more non-transitory computer-readable media having stored thereon programming instructions configured to cause one or more self-organizing network (SON) tools executing via a SON automation engine on one or more SON computing devices to perform operations comprising:

receiving, via an application programming interface (API) for SONs that is exposed to the one or more SON tools by the SON automation engine, information indicating that a base station of a telecommunication network is experiencing a power outage but is continuing to operate on at least one of reduced or backup power due to 1) a loss of a main power supply and a corresponding use of a backup power supply, or 2) an available power level dropping below a threshold;

retrieving, via the API from an equipment data store of the one or more SON computing devices, a present configuration of the base station and one or more characteristics of the base station including at least one of backup power resources of the base station, cellular technologies supported by the base station, or a size of a cell serviced by the base station;

receiving, via the API from a consolidation engine executing on the one or more SON computing devices, at least one performance indicator associated with the base station, including at least one of a battery level, a fuel level, a generator status, or a backup power supply status;

generating an updated configuration of the base station based at least in part on the present configuration of the base station, the one or more characteristics of the base station, and the at least one performance indicator, wherein the updated configuration reduces power requirements of the base station during the power outage; and providing the updated configuration to the base station via the API.

10. The one or more non-transitory computer-readable media of claim 9, wherein the one or more SON tools receives the information indicating that the base station is experiencing the power outage as:

an alert from a component of the one or more SON computing devices, wherein the component of the one or more SON computing devices generates the alert based on the at least one performance indicator or other information from the base station, or the at least one performance indicator, wherein the one or more SON tools determine that the at least one performance indicator indicates that the base station is experiencing the power outage based on a comparison of the at least one performance indicator to one or more power outage thresholds or models.

11. The one or more non-transitory computer-readable media of claim 9, wherein the at least one performance indicator further includes a signal-to-noise ratio, a bit error rate, a frame error rate, a number of carriers, a number of connections, cellular technology types of the connections, a maximum transmit power, or a maximum bit rate.

12. The one or more non-transitory computer-readable media of claim 9, wherein the updated configuration causes the base station to perform at least one of turning off air conditioning, turning off a main power supply, adjusting a voltage of a backup power supply, disconnecting 2G, 3G, 4G, LTE, or other cellular or wireless services, shutting down one or more carriers, reducing a maximum transmit power, or adjusting a maximum bit rate.

13. The one or more non-transitory computer-readable media of claim 9, wherein the operations further comprise periodically receiving subsequent information indicating that the base station is continuing to experience the power outage, and in response generating subsequent updated configurations and providing the subsequent updated configurations to the base station to progressively degrade service capabilities of the base station to further reduce the power requirements of the base station.

14. A self-organizing network (SON) computing device comprising:

one or more processors;
an equipment data store storing a present configuration of a base station of a telecommunication network and one or more characteristics of the base station, including at least one of backup power resources of the base station, cellular technologies supported by the base station, or a size of a cell serviced by the base station;
a consolidation engine configured to be operated by the one or more processors to determine at least one performance indicator associated with the base station, including at least one of a battery level, a fuel level, a generator status, or a backup power supply status; and
a SON automation engine configured to be operated by the one or more processors to execute one or more SON tools to perform operations including:
receiving, via an application programming interface (API) for SONs that is exposed to the one or more SON tools by the SON automation engine, information indicating that the base station is experiencing a power outage but is continuing to operate on at least one of reduced or backup power due to 1) a loss of a main power supply and a corresponding use of a backup power supply, or 2) an available power level dropping below a threshold;
retrieving, via the API from the equipment data store, the present configuration of the base station and the one or more characteristics of the base station;
receiving, via the API from the consolidation engine, the at least one performance indicator associated with the base station;
generating an updated configuration of the base station based at least in part on the present configuration of the base station, the one or more characteristics of the base station, and the at least one performance indicator, wherein the updated configuration reduces power requirements of the base station during the power outage;
providing the updated configuration to the base station via the API; and
periodically receiving subsequent information via the API indicating that the base station is continuing to experience the power outage, and in response generating subsequent updated configurations and providing the subsequent updated configurations to the base station via the API to progressively degrade service capabilities of the base station to further reduce power requirements of the base station.

15. The SON computing device of claim 14, wherein the one or more SON tools receives the information indicating that the base station is experiencing the power outage as:
an alert from a component of the SON computing device, wherein the component of the SON computing device generates the alert based on the at least one performance indicator or other information from the base station, or
the at least one performance indicator, wherein the one or more SON tools determine that the at least one performance indicator indicates that the base station is experiencing the power outage based on a comparison of the at least one performance indicator to one or more power outage thresholds or models.

16. The SON computing device of claim 14, wherein the at least one performance indicator further includes a signal-to-noise ratio, a bit error rate, a frame error rate, a number of carriers, a number of connections, cellular technology types of the connections, a maximum transmit power, or a maximum bit rate.

17. The SON computing device of claim 14, wherein the updated configuration causes the base station to perform at least one of turning off air conditioning, turning off a main power supply, adjusting a voltage of a backup power supply, disconnecting 2G, 3G, 4G/LTE, or other cellular or wireless services, shutting down one or more carriers, reducing a maximum transmit power, or adjusting a maximum bit rate.

18. The computer-implemented method of claim 1, further comprising:
determining, by the one or more SON tools, a time since the power outage began,
wherein the one or more SON tools generate the updated configuration of the base station based further in part on the time since the power outage began.

19. The computer-implemented method of claim 1, wherein the one or more SON tools generate the updated configuration of the base station by applying a model to at least the one or more characteristics and the at least one performance indicator.

20. The computer-implemented method of claim 1, wherein the one or more SON tools generate the updated configuration of the base station comprises using a configuration change template that corresponds to at least the one or more characteristics and the at least one performance indicator.

* * * * *